(12) United States Patent
Murata

(10) Patent No.: US 6,693,866 B1
(45) Date of Patent: Feb. 17, 2004

(54) OPTICAL DISK RECORDING APPARATUS

(75) Inventor: Morihiro Murata, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 668 days.

(21) Appl. No.: 09/640,616

(22) Filed: Aug. 17, 2000

(30) Foreign Application Priority Data

Aug. 31, 1999 (JP) .......................................... 11-244849

(51) Int. Cl.[7] ................................................ G11B 7/00
(52) U.S. Cl. .................................. 369/53.34; 369/47.32
(58) Field of Search .......................... 369/30.04, 30.05, 369/30.08, 47.12, 47.21, 47, 31, 47.32, 47.33, 47.34, 47.35, 47.46, 53.16, 53.34, 53.41, 59.11, 59.16, 59.19, 59.21, 59.24, 53.36, 53.35

(56) References Cited

U.S. PATENT DOCUMENTS

| | | | | |
|---|---|---|---|---|
| 4,224,642 A | * | 9/1980 | Mawatari et al. | 360/32 |
| 4,617,599 A | * | 10/1986 | Noguchi et al. | 360/32 |
| 4,823,207 A | * | 4/1989 | Kobayashi et al. | 360/32 |
| 5,285,289 A | * | 2/1994 | Hatanaka et al. | 386/104 |
| 5,319,501 A | * | 6/1994 | Mitsuhashi | 386/101 |
| 5,412,628 A | * | 5/1995 | Yamazaki et al. | 369/30.19 |
| 5,453,967 A | * | 9/1995 | Aramaki et al. | 369/47.11 |
| 5,535,356 A | * | 7/1996 | Kim et al. | 711/103 |
| 5,668,789 A | * | 9/1997 | Yokota et al. | 369/47.11 |
| 6,172,948 B1 | * | 1/2001 | Keller et al. | 369/83 |

* cited by examiner

Primary Examiner—Thang V. Tran
Assistant Examiner—Bach Vuong
(74) Attorney, Agent, or Firm—Pillsbury Winthrop LLP

(57) ABSTRACT

An optical disk recording apparatus includes an input device that receives an input digital audio signal sampled by a predetermined sampling rate, an external reference clock pulse generator that reproduces a first reference clock pulse on the basis of the input digital audio signal, an internal reference clock pulse generator that generates a second reference clock pulse, a buffer memory that stores the input digital audio signal therein in synchronism with the first reference clock pulses, and that reads out a stored input digital audio signal therefrom in shynchronism with the second reference clock pulses, an operator operable by a user to give an instruction as to whether an inter-music-piece blank signal is to be recorded or not, the inter-music piece blank signal being capable of recording onto an optical disk before recording of the input digital audio signal read from the buffer memory, and a controller that, on the basis of the instruction from the operator, when the inter-music piece blank signal is to be recorded, makes to reduce a time interval from start of storing of the digital audio signals into the buffer memory to a start of recording of the digital audio signals onto the optical disk as compared to when the blank signal is not to be recorded.

12 Claims, 6 Drawing Sheets

OPTICAL DISK RECORDING APPARATUS

BACKGROUND OF THE INVENTION

The present invention relates to optical disk recording apparatus for recording audio signals onto optical disks in digital representation. More particularly, the present invention relates to an improved optical disk recording apparatus which is arranged to temporarily store input digital audio signals into a buffer memory in synchronism with clock pulses reproduced from the input digital audio signals and then read out, from the buffer memory, the digital audio signals in synchronism with reference clock pulses, generated by an internal reference clock pulse generator, to thereby record the read-out audio signals onto an optical disk at a same sampling rate as the input digital audio signals, and which can appropriately reduce a wait time from a time point when an instruction for terminating the recording is given to a time when the recording is actually terminated in response to the instruction.

As an example of the optical disk recording apparatus for recording audio signals onto an optical disk in digital representation, the audio CD (Compact Disc) recorder has been put to actual use, which is constructed to record input audio signals onto a CD-R (CD Recorder/CD Write-Once) or CD-RW(CD Rewritable) disk in a CD format. Such an audio CD recorder accepts input of both analog audio signals and digital audio signals. When the input of digital audio signals has been selected, the audio CD recorder generally records the input digital audio signals onto an optical disk after having converted the sampling rate of the input digital audio signals to the CD sampling rate of 44.1 kHz. If the sampling rate of the input digital audio signals is the same as the CD sampling rate (e.g., if the input digital audio signals have been received from a CD), the input digital audio signals can be recorded as the so-called "CD direct recording" without the sampling rate conversion. In the CD direct recording, 44.1 kHz clock pulse signals are first reproduced from the input digital audio signals. In synchronism with the thus-reproduced clock pulse signals, the input digital audio signals are temporarily written into a buffer memory and then the digital audio signals are read out from the buffer memory and recorded onto the optical disk. At that time, the clock pulses are frequency-divided to create 22.05 kHz clock pulse signals, and rotation of a spindle motor driving the optical disk is controlled in a PLL (Phase-Locked Loop) fashion so that a wobble frequency detected from the optical disk coincides with the frequency of the thus-created clock pulse signals. Also, the reproduced clocks are frequency-multiplied and then fed to a recording strategy circuit so as to finely adjust/control an irradiation time and irradiation start timing of a recording laser light beam.

However, because the above-mentioned conventional recording technique operates the recording strategy circuit by use of the reproduced clocks having a relatively poor accuracy (i.e., having relatively great time axial variations), the irradiation time and irradiation start timing of the recording laser light beam tend to be finely adjusted with a very poor accuracy relative to predetermined adjustment amounts, which would unavoidably result in degradation of recording signal quality and increased reading errors at the time of reproduction. Thus, it is now being proposed that the CD direct recording be carried out on the optical disk using, in place of the reproduced clock pulses, reference clock pulses generated by an internal reference clock pulse generator such as a crystal oscillator. More specifically, according to the proposed recording scheme, the 44.1 kHz clock pulse signals are first reproduced from the input digital audio signals so that the input digital audio signals are temporarily written into the buffer memory in synchronism with the reproduced clock pulses, and then 44.1 kHz clock pulse signals are created on the basis of the reference clock pulses generated by the internal reference clock pulse generator. Thence, the digital audio signals are read out from the buffer memory and recorded onto the optical disk in synchronism with the 44.1 kHz clock pulse signals based on the reference clock pulses. At that time, 22.05 kHz clock pulse signals are also created on the basis of the reference clock pulses, and the rotation of the spindle is controlled in the PLL fashion so that the wobble frequency detected from the optical disk coincides with the frequency of the 22.05 kHz clock pulse signals. In addition, the recording strategy circuit is controlled on the basis of the reference clock pulses so as to control the irradiation time and irradiation start timing of the recording laser light beam. By thus operating the recording strategy circuit on the basis of the highly accurate reference clock pulses, the proposed recording scheme provides for recording with high recording signal quality and hence reproduction with minimized reading errors.

But, because the reproduced clock pulses used to temporarily write the input digital audio signals into the buffer memory and the reference clock pulses used to read out the digital audio signals from the buffer memory are not synchronous with each other in the proposed recording scheme, and if the speed of reading from the buffer memory is higher than the speed of writing into the buffer memory, then the buffer memory would run out of data to cause a so-called "buffer underrun" situation and thus the recording fails. To prevent the undesired buffer underrun, it is necessary to start the recording onto the optical disk only after a sufficient quantity of data have been stored in the buffer memory. For example, in the case of a CD whose recording length is 80 min. and for which the reproduced clock pulses differ from the reference clock pulses by 300 PPM, the following time difference would result between the time for writing all the data into the buffer memory and the time for reading all the data from the buffer memory:

$$300 \text{ (PPM)} \times 80 \text{ (min)} \times 60 \text{ (sec.)} = 1.44 \text{ (sec.)}$$

Thus, in this case, there arises a need to start the recording onto the optical disk 1.44 sec. after the writing of the input signals into the buffer memory has been initiated in response to a user's instruction for starting the recording, as illustrated in FIG. 2.

Further, according to the above-mentioned CD format, an inter-music-piece blank signal, indicative of a blank segment between adjoining music pieces (silent signal), can be recorded at the beginning of each track (e.g., each music piece) in a program area, by setting an index of Q subcode to "0". Each inter-music-piece blank signal has one of predetermined lengths, i.e. two or more seconds for the first track and zero (i.e. no blank segment between the music pieces, is also selectable) and more seconds for second and succeeding tracks. In FIG. 3, there is shown an exemplary manner in which the inter-music-piece blank signals are recorded onto an optical disk. When a music piece (a single track) is to be recorded onto a CD-R or CD-RW disk with an inter-music-piece blank segment, the inter-music-piece blank signal is first recorded onto the optical disk and the music piece is recorded immediately after the recording of the inter-music-piece blank signal (namely, with one stroke). Assuming that the recording onto the optical disk is started 1.44 sec. after the user gives a recording start instruction to initiate writing of input signals into the buffer memory similarly to the above-mentioned, the recording start of the music piece would be delayed more than 1.44 sec. from the user's recording start instruction because the recording onto the optical disk is started after the inter-music-piece blank signal recording. FIG. 4 shows a situation in which the inter-music-piece blank signal is recorded for two seconds in the above-mentioned manner. Namely, the recording onto the optical disk is started 1.44 sec. after the user gives the recording start instruction to initiate the writing of the input signals into the buffer memory, and the recording of the music piece is initiated after the inter-music-piece blank signal has been recorded for two seconds. Thus, a long time would be required from the time of the user's instruction for starting the recording to the time when the recording is actually started in response to the instruction. This means that a long time would also be required from a time point when the user instructs termination of the recording to a time when the recording is actually terminated in response to the instruction, so that even when the user wants to remove the disk or reproduce the recorded contents from the disk immediately after the terminating instruction, the user has to wait for a long time.

Although not specifically mentioned above, the recording on the CD-R or CD-RW disk, in effect, would also require a considerable wait for servo pull-in operations (including seek operations) from turning-on of various servomechanisms to a time when the servomechanisms have been actually brought to readiness for the recording. If the user turns on the various servomechanisms 1.44 sec. after the recording start instruction to initiate the writing of the input signals into the buffer memory and then starts recording of the blank signal after completion of the servo pull-in operations, then the start of the music piece recording would be delayed further, with the result that an even longer time would be required from the time when the user gives the recording terminating instruction to the time when the recording is actually terminated in response to the instruction. In addition, the wait would be further prolonged by a time required for recording position information into a PMA (Program Memory Area) following the end of the input audio signal recording.

SUMMARY OF THE INVENTION

In view of the foregoing, it is an object of the present invention to provide an optical disk recording apparatus which is arranged to temporarily store input digital audio signals into a buffer memory in synchronism with clock pulses reproduced from the input digital audio signals and then read out, from the buffer memory, the digital audio signals in synchronism with reference clock pulses, generated by an internal reference clock pulse generator, to thereby record the read-out signals onto an optical disk at a same sampling rate as the input digital audio signals and which can appropriately reduce a wait from a time point when an instruction for terminating recording is given to a time when the recording is actually terminated in response to the instruction.

In order to accomplish the above-mentioned object, the present invention provides an optical disk recording apparatus comprising an input device that receives an input digital audio signal sampled by a predetermined sampling rate, an external reference clock pulse generator that reproduces a first reference clock pulse on the basis of the input digital audio signal, an internal reference clock pulse generator that generates a second reference clock pulse, a buffer memory that stores the input digital audio signal therein in synchronism with the first reference clock pulses, and that reads out a stored input digital audio signal therefrom in shynchronism with the second reference clock pulses, an operator operable by a user to give an instruction as to whether an inter-music-piece blank signal is to be recorded or not, the inter-music piece blank signal being capable of recording onto an optical disk before recording of the input digital audio signal read from the buffer memory, and a controller that, on the basis of the instruction from the operator, when the inter-music piece blank signal is to be recorded, makes to reduce a time interval from start of storing of the digital audio signals into the buffer memory to a start of recording of the digital audio signals onto the optical disk as compared to when the blank signal is not to be recorded.

When the inter-music-piece blank signal is to be recorded in the inventive optical disk recording apparatus, the start of the recording of the input digital audio signals onto the optical disk is delayed, so that a greater quantity of data would be stored in the buffer memory. Thus, even if the start of the recording onto the optical disk is advanced or moved up, there would occur no undesired buffer underrun; that is, the start of the recording onto the optical disk can be advanced, without involving inconveniences, as compared to when the inter-music-piece blank signal is not to be recorded. By thus advancing the start of the recording onto the optical disk, it is possible to significantly shorten a wait time from a time point when an instruction is given for terminating the recording to a time when the recording is actually terminated in response to the instruction. When an inter-music-piece blank signal of a relatively long recording length is to be recorded, control may be performed for starting the recording of the digital audio signals onto the optical disk substantially simultaneously with the start of writing of the digital audio signals into the buffer memory.

According to another aspect of the present invention, there is provided an optical disk recording apparatus which receives input digital audio signals of a predetermined sampling rate, temporarily stores the digital audio signals into a buffer memory in synchronism with clock pulses reproduced from the digital audio signals and then reads out, from the buffer memory, the digital audio signals in synchronism with reference clock pulses, generated by an internal reference clock pulse generator to thereby record the digital audio signals onto an optical disk at a same sampling rate as the input digital audio signals, which is also capable of recording an inter-music-piece blank signal, generated within the optical disk recording apparatus, onto the optical disk at the beginning of recording and then reading out the digital audio signals from the buffer memory for recording onto the optical disk following recording of the blank signal, and which comprises: an operator operable by a user to variably set a recording length of the inter-music-piece blank signal; and a controller that, on the basis of a user operation of the operator, makes to, when an inter-music-piece blank signal of a relatively long recording length is to be recorded, reduce a time interval from a start of writing of the digital audio signals into the buffer memory to a start of recording of the digital audio signals onto the optical disk as compared to when an inter-music-piece blank signal of a shorter recording length is to be recorded.

When an inter-music-piece blank signal of a long recording length is to be recorded in the inventive optical disk recording apparatus, the start of the recording of the digital audio signals onto the optical disk is delayed correspondingly, and a greater quantity of data would be stored in the buffer memory. Thus, even if the start of the recording onto the optical disk is advanced, there would occur no undesired buffer underrun, so that the start of the recording onto the optical disk can be advanced, without involving inconveniences, as compared to when an inter-music-piece blank signal of a shorter recording length is to be recorded. By thus advancing the start of the recording onto the optical disk, it is possible to significantly shorten a wait time from a time point when an instruction is given for terminating the recording to a time when the recording is actually terminated in response to the instruction. Note that when an inter-music-piece blank signal of more than a predetermined recording length is to be recorded, control may be performed for starting the recording of the digital audio signals onto the optical disk substantially simultaneously with the start of writing of the digital audio signals into the buffer memory.

The optical disk recording may be arranged to select, as the audio signals to be inputted thereto, from among digital audio signals of a sampling rate equal to a recording sampling rate of an optical disk, digital audio signals of a sampling rate different from the recording sampling rate of the optical disk and analog audio signals, and then record the input audio signals onto the optical disk after converting the sampling rate of the audio signals to coincide with the recording sampling rate of the optical disk. When the digital audio signals of the sampling rate different from the recording sampling rate of the optical disk or the analog audio signals are selected as the audio signals to be inputted, the control section performs control for starting recording of the audio signals onto the optical disk substantially simultaneously with a start of writing of the audio signals into said buffer memory, irrespective of presence/absence or recording length of the inter-music-piece blank signal.

For each of the above-mentioned types of input audio signals, a motor controller for controlling rotation of a spindle motor and a recording strategy circuit for performing fine adjustment/control of an irradiation time and irradiation start timing of a recording laser light beam, which are both provided in the optical disk recording apparatus, perform various predetermined control in synchronism with the reference clock pulses. Further, the optical disk recording apparatus may be constructed as an audio CD recorder, in which case the optical disk may be a CD-R disk or CD-RW disk.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENT

Figure 5:
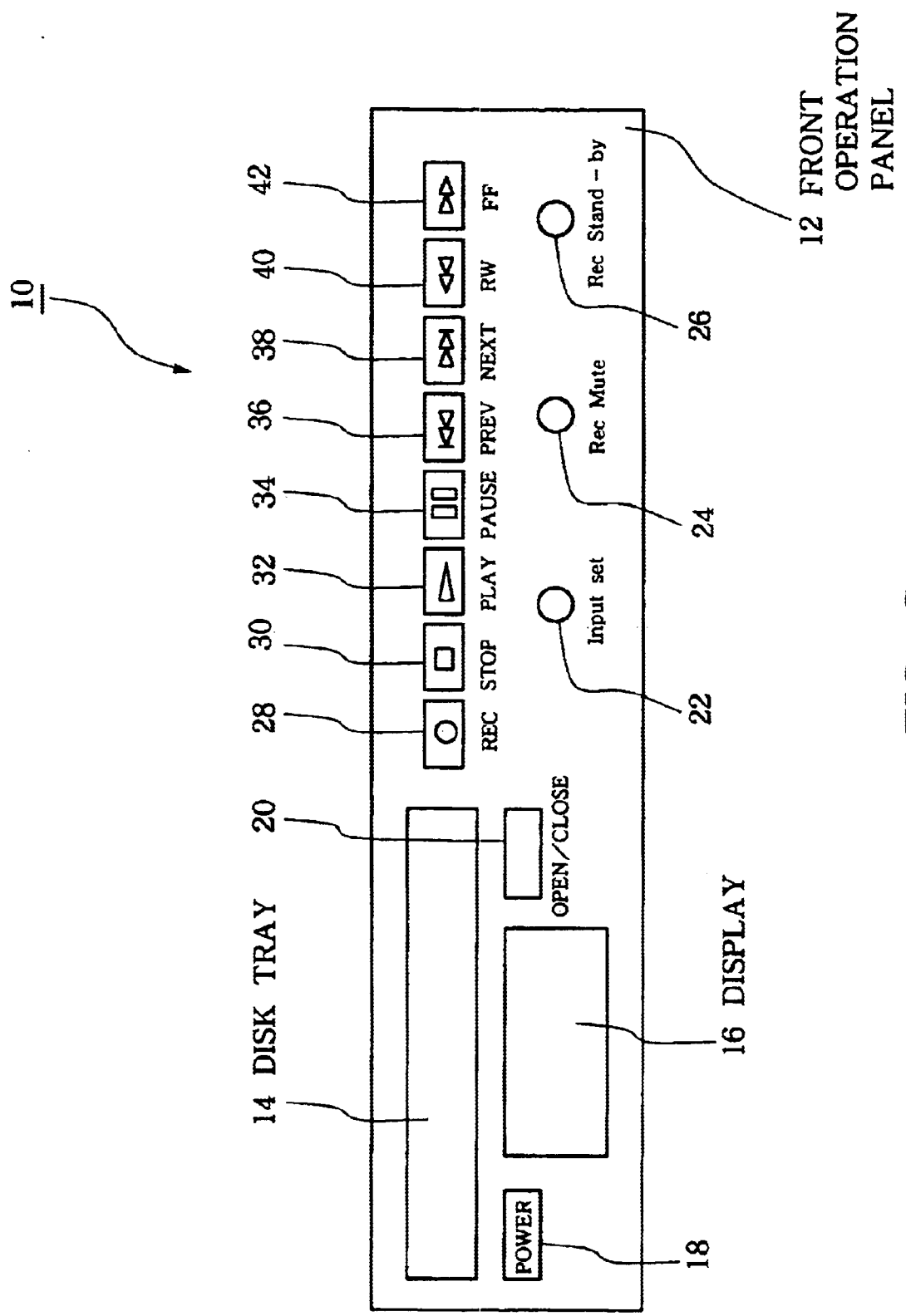
FIG. 5 is a diagram showing a front operation panel of the audio CD recorder of the present invention shown in FIG. 1.

Now, the preferred embodiments of the present invention will be described in relation to the case where the basic principles of the invention are applied to an audio CD recorder. FIG. 5 is a diagram showing a front operation panel 12 of the audio CD recorder 10, on which there are provided a disk tray 14 and a display 16. On the front operation panel 12, there are also provided various manual operators, such as a power on/off button 18, a tray opening/closing button 20, an input selecting button 22, a recording muting button 24, a recording standby button 26, a recording button 28, a stop button 30, a reproduction (play) button 32, a pause button 32, a skip back button (i.e., a button for causing the reproduction to jump back to the beginning of a music piece being currently played or reproductively performed) 36, a skip forward button (i.e., a button for causing the reproduction to jump to the beginning of a next music piece) 38, a fast-rewinding button 40 and a fast-forwarding button 42.

More specifically, the input selecting button 22 is operable by a human operator or user to select a type of input signals to be recorded onto an optical disk (CD-R or CD-RW disk). In the illustrated example, the audio CD recorder 10 is equipped with three recording input terminals: an analog input terminal; and first and second digital input terminals (digital input 1 and digital input 2). Each time the input selecting button 22 is depressed, cyclic switching is made between the analog input terminal, first digital input terminal and second digital input terminal. The recording muting button 24 is operable by the user to give an instruction as to whether or not an inter-music-piece blank signal should be recorded onto the optical disk. Each time the recording muting button 24 is depressed, switching is made between a mute-on condition (i.e., condition for recording an inter-music-piece blank signal) and a mute-off condition (i.e., condition for not recording an inter-music-piece blank signal). When the mute-on condition is selected via this recording muting button 24, an inter-music-piece blank signal of a fixed length (e.g., two sec.) is recorded onto the optical disk. Note that the recording length of the inter-music-piece blank signal, which is to be recorded in response to user's selection of the mute-on condition, may be set variably and the function to variably set a recording length of the inter-music-piece blank signal may be assigned to the recording muting button 24 or a dedicated manual operator. In the case where the recording muting button 24 has the function to variably set a recording length of the inter-music-piece blank signal, the muting time (i.e., the recording length of the inter-music-piece blank signal) may be caused to vary from an initial zero-sec. length by a predetermined increment each time the recording muting button 24 is depressed and may be incremented again from the initial zero-sec. length once a predetermined maximum length is reached, so that each inter-music-piece blank signal can be recorded with a desired length. The recording standby button 26 is provided for the user to turn on or activate various servomechanisms of the CD recorder prior to a start of desired recording onto the optical disk. More specifically, in response to the activation of the servomechanisms via the recording standby button 26, an optical head of the CD recorder is set at a predetermined recording start position in a diametric direction of the optical disk (i.e., a start position in a disk's program area, or a linking position at the end of last recording), and a spindle motor is controlled such that a predetermined linear velocity is obtained immediately at the predetermined recording start position (i.e., the spindle motor is placed in readiness to immediately initiate the desired recording).

Figure 6:
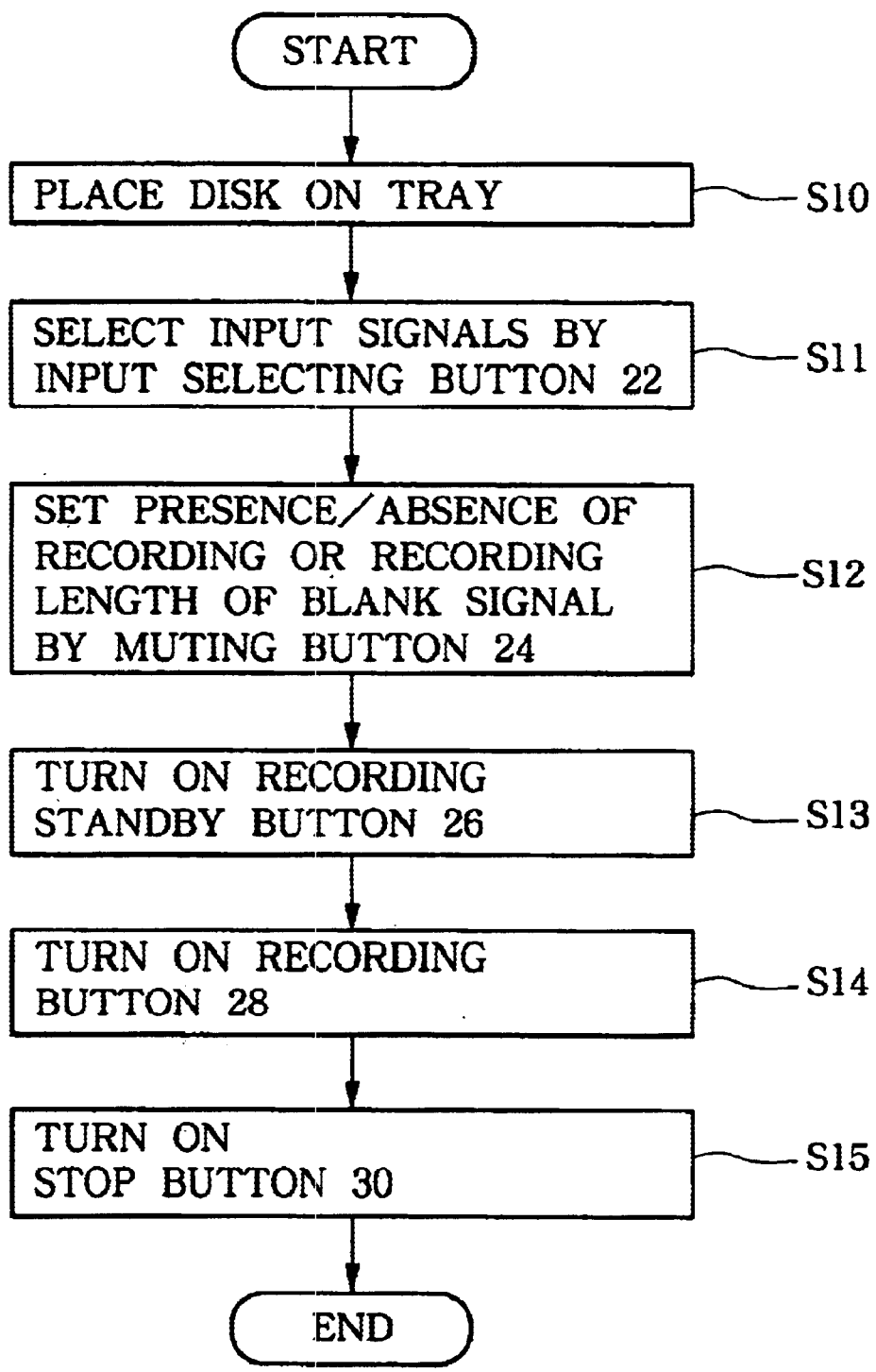
FIG. 6 is a flow chart showing an exemplary sequence of operations performed by the audio CD recorder of FIG. 1 for recording onto the optical disk.

FIG. 6 is a flow chart showing an exemplary sequence of operations for recording onto an optical disk. First, the optical disk is placed on the disk tray 14 at step S10, and a desired type of input signals is selected by means of the input selecting button 22 at step S11. Then, whether or not an inter-music-piece blank signal should be recorded or a desired recording length of the inter-music-piece blank signal is selected by means of the recording muting button 24 at step S12, and the recording standby button 26 is turned on to place the CD recorder in a recording standby state at step S13. Once the recording button 28 is depressed at step S14 under these conditions, writing of the input audio signals into a predetermined buffer memory is initiated, and at the same time or after a lapse of a predetermined wait time, the inter-music-piece blank signal is recorded (if so selected at step S11). Immediately after the recording of the inter-music-piece blank signal, the input audio signals are read out from the buffer memory and recorded onto the optical disk. Then, once the stop button 30 is depressed at step S15, the writing of the input signals into the buffer memory is terminated and the recording is brought to an end only after all the input signals remaining in the buffer memory have been read out and recorded onto the optical disk. Various settings prior to the start of the recording (e.g., the selected type of input signals, and presence/absence of the inter-music-piece blank signal or the recording length of the blank signal) and operational state during the recording (e.g., the recording standby state or recording state) are visually shown on the display 16.

Figure 1:
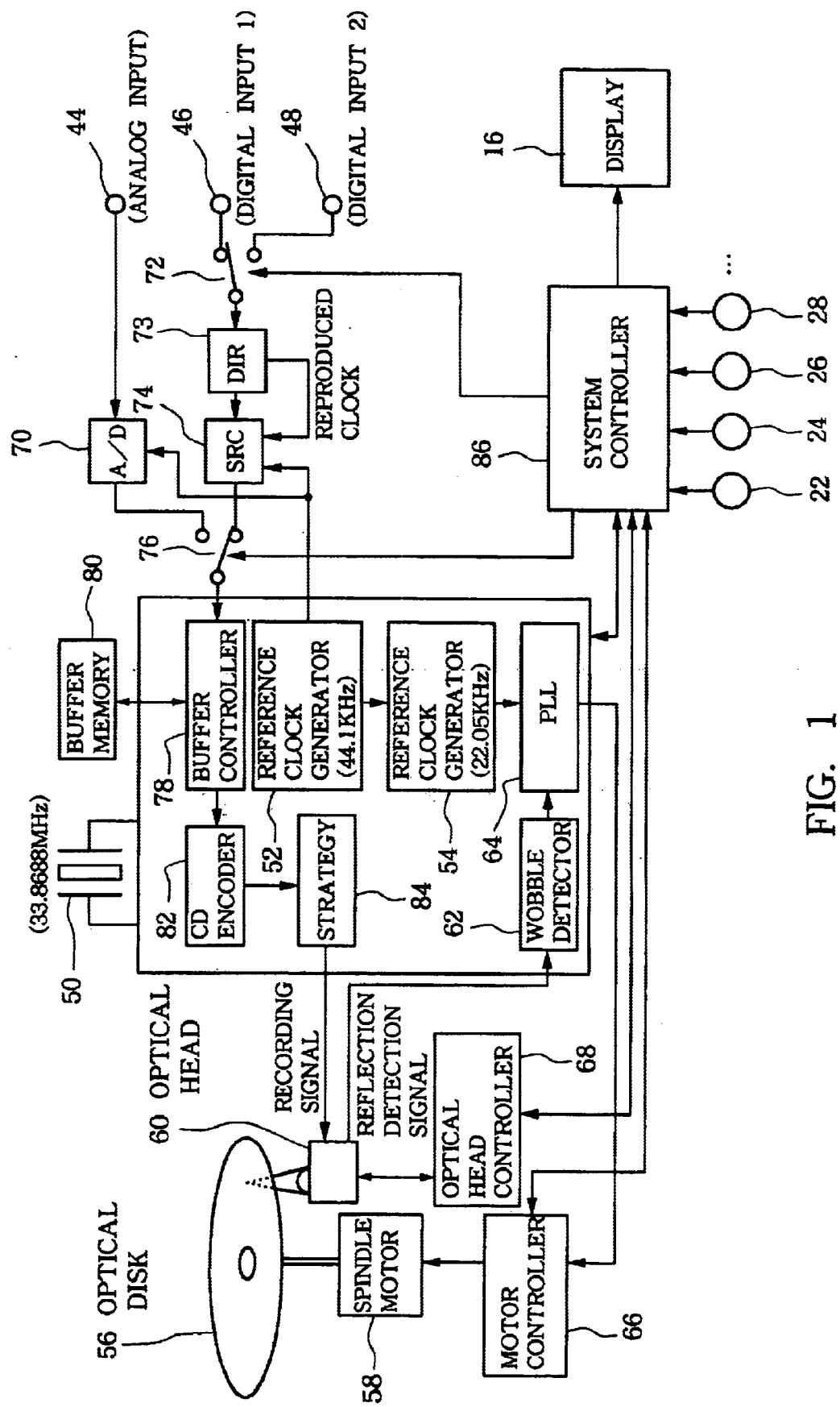
FIG. 1 is a block diagram showing principal electric components of an audio CD recorder in accordance with a preferred embodiment of the present invention.
Figure 2:
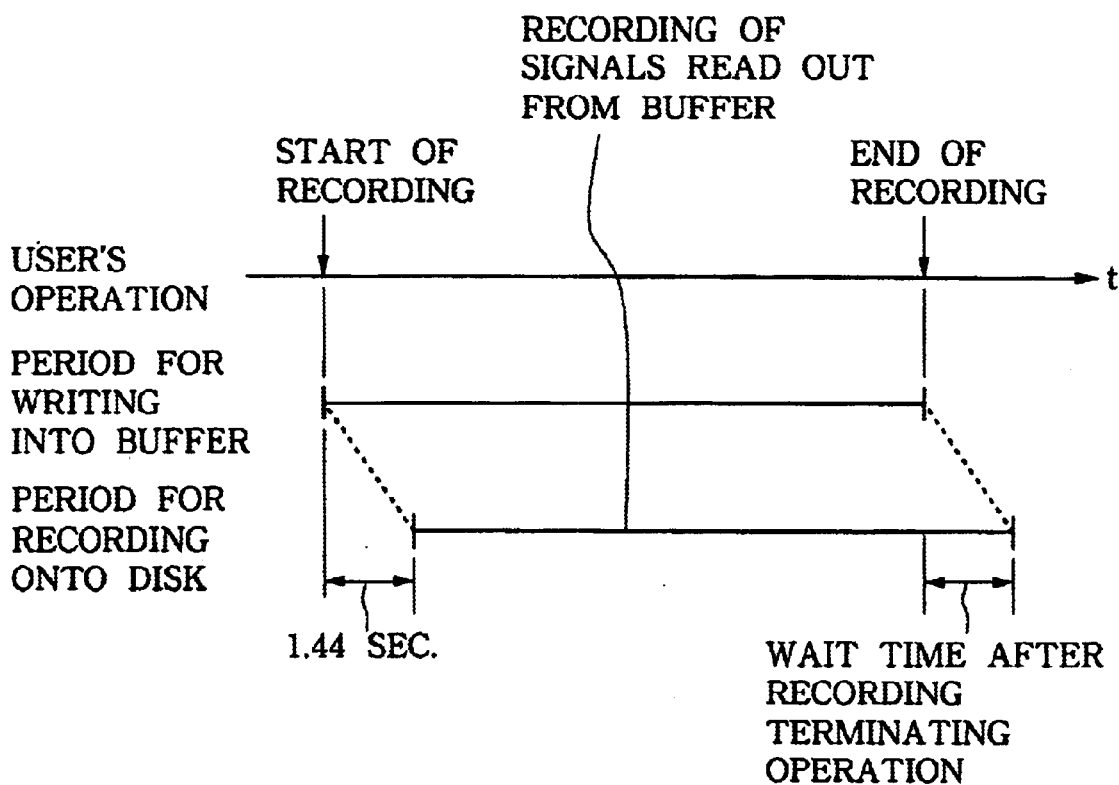
FIG. 2 is a time chart showing an exemplary relationship between user's operation timing, a time period when input audio signals are written into a buffer memory of FIG. 1 and a time period when the audio signals are recorded onto an optical disk of FIG. 1.
Figure 3:
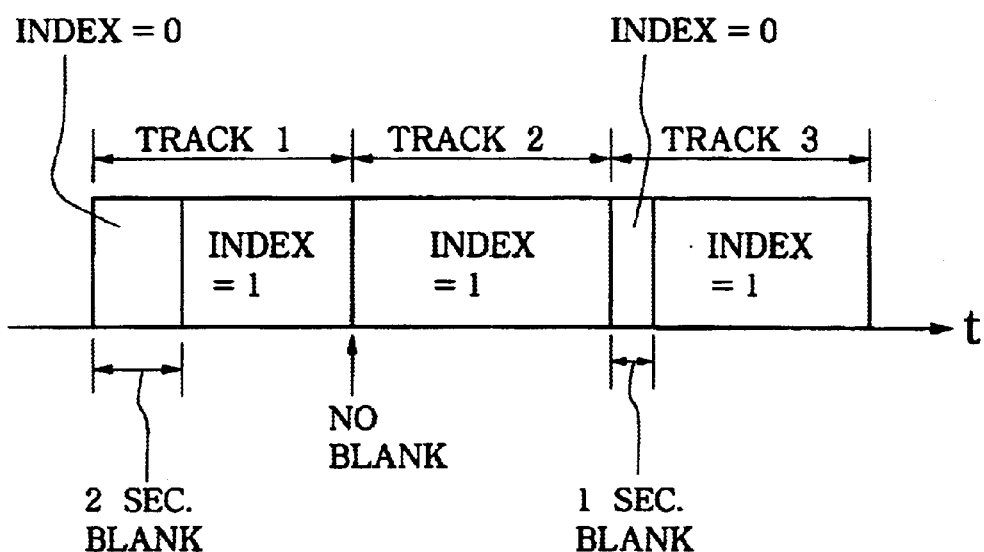
FIG. 3 is a diagram showing an exemplary manner in which audio signals and an inter-music-piece blank signal are recorded in accordance with a conventional optical disk recording scheme.
Figure 4:
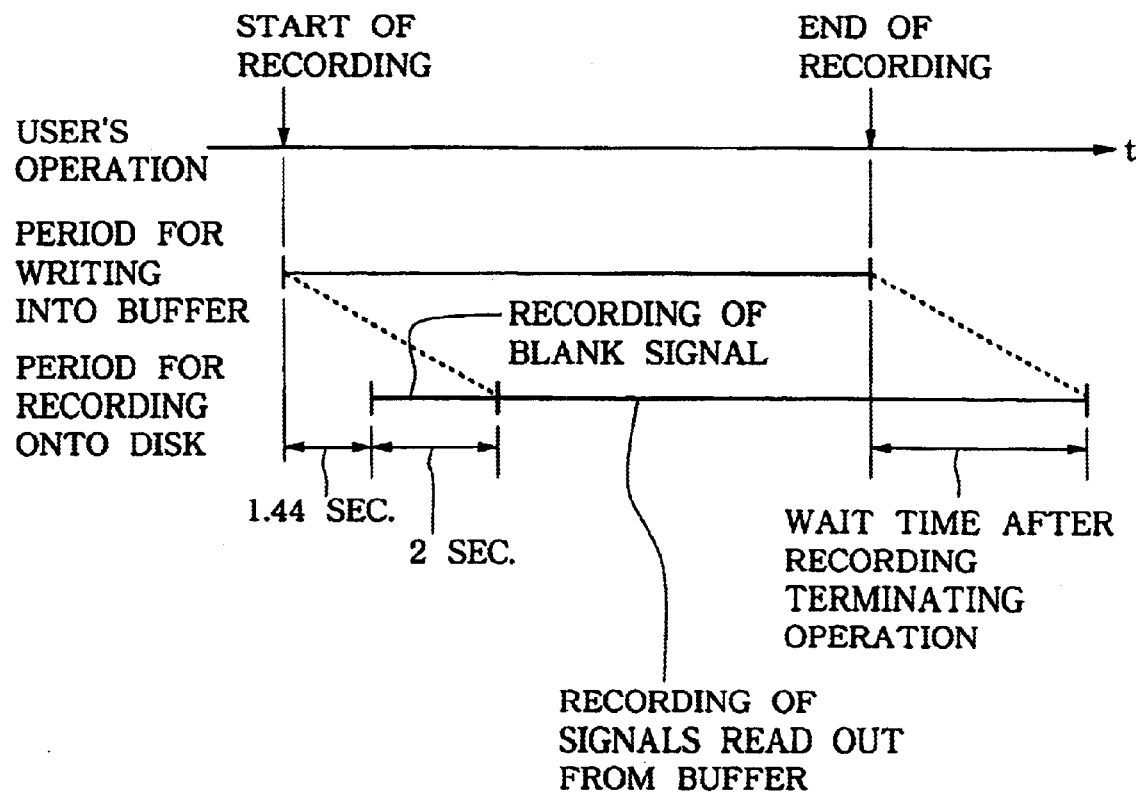
FIG. 4 is a diagram showing another exemplary manner in which audio signals and inter-music-piece blank signal are recorded in accordance with a conventional optical disk recording scheme.

In FIG. 1, there are shown principal electric components of the audio CD recorder 10 partly shown in FIG. 5. As noted earlier, the audio CD recorder 10 includes the analog input terminal 44, first digital input terminal (digital input 1) 46 and second digital input terminal (digital input 2) 48. Within the CD recorder 10, there is provided, as a reference clock pulse generator, a crystal oscillator 50 that outputs reference clock pulses, for example, of 33.8688 MHz. Reference clock pulse generator circuit 52 frequency-divides the reference clock pulses output from the crystal oscillator 50, to thereby generate reference clock pulses of 44.1 kHz corresponding to the CD sampling frequency. Another reference clock pulse generator circuit 54 performs ½ frequency division on the 44.1 kHz reference clock pulses, to thereby generate 22.1 kHz reference clock pulses.

The optical disk (CD-R or CD-RW disk) 56 placed on the disk tray 14 is driven to rotate via the spindle motor 58 so that recording and reproduction of designated information is performed by means of the optical head 60. Wobble detector circuit 62 detects a wobble signal component from each reflected-light detection signal generated by the optical head 60. PLL (Phase-Locked Loop) circuit 64 compares respective phases of the detected wobble signal and the 22.5 kHz reference clock pulse from the reference clock pulse generator circuit 54 in a direct manner when a normal recording speed is selected; however, when a higher recording speed is selected, the comparison is made between the phase of the detected wobble signal and the phase of the 22.5 kHz reference clock pulse as multiplied by a speed increase ratio. The spindle motor 58 is controlled via a motor controller 66 so that the motor 58 is pulled into and held in a phase-locked state. Optical head controller 68 performs tracking, focusing and feeding control on the optical head 60.

Analog audio signals received via the analog input terminal 44 are each sampled by an A/D converter 70 in accordance with the 44.1 kHz reference clock pulses and converted into digital representation. Digital audio signals received via the first digital input terminal 46 or second digital input terminal 48, selected via the input selecting button 22, are each passed through a switch 72 to a digital interface receiver (DIR) 73. The digital interface receiver (DIR) 73 corrects a duty ratio error of the input signals and converts the input signals into a format that can be readily handled within the audio CD recorder 10. Also, the digital interface receiver 73 automatically detects a sampling frequency of the input signals, and separates 44.1 kHz word clock pulses (i.e., performs clock reproduction) only when the 44.1 kHz sampling frequency for CDs has been detected. The thus-processed input signals are delivered to a sampling rate converter (SRC) 74, which uses the 44.1 kHz reference clock pulses to convert the sampling frequency of the input signals into the CD's 44.1 kHz sampling frequency. Note that when the 44.1 kHz sampling frequency has been detected by the digital interface receiver 73, i.e. when digital audio signals reproduced from another CD have been input to the CD recorder 10, the sampling rate converter (SRC) 74 is deactivated so that the input audio signals are output from the sampling rate converter 74 asynchronously with the reference clock pulses.

Depending on the selection via the input selecting button 22, the analog audio signals A/D-converted via the A/D converter 70 or the digital audio signals output from the sampling rate converter 74 are passed through a switch 76 to a buffer controller 78, so that the input audio signals are temporarily written into the buffer memory 80 and then read out from the buffer memory 80. If the inputs are the analog audio signals or digital audio signals of a frequency other than 44.1 kHz, then the input audio signals are written into the buffer memory 80 in synchronism with the 44.1-kHz reference clock pulses, while if the inputs are the digital audio signals of 44.1 kHz, the input signals are written into the buffer memory 80 in synchronism with clock pulses of 44.1 kHz reproduced from the input signals. In any case, the input audio signals are read out from the buffer memory 80 in synchronism with the 44.1 kHz reference clock pulses. Note that the writing of the input audio signals into the buffer memory 80 is initiated simultaneously with the turning-on of the recording button 28 and terminated simultaneously with the turning-on of the stop button 30. The signals read out from the buffer memory 80 are encoded via a CD encoder 82 into the CD format and then fed to a recording strategy circuit 84 for adjustments of their time axes that correspond to fine adjustments of an irradiation time and irradiation start timing of a recording laser light beam. The adjusted signals output from the recording strategy circuit 84 are then fed to a laser drive for the optical head 60, where they are used to modulate the recording laser light beam for recording onto the optical disk 56. For each type of the input signals, the recording strategy circuit 84 is controlled in synchronism with the reference clock pulses. The audio CD recorder 10 also includes a system controller 86 that controls operation of the entire apparatus. When recording of an inter-music-piece blank signal is instructed by means of the recording muting button 24, the CD encoder 82 automatically records an inter-music-piece blank signal with an index of Q subcode set to "0", after which the input audio signals are read out from the buffer memory 80. In response to the user's selection as to presence/absence of recording of the inter-music-piece blank signal or recording length of the inter-music-piece blank signal and the user's selection via the input selecting button 22, the system controller 86 controls a wait time from the turning-on of the recording button 28 to the output of recording signals from the CD encoder 82 (i.e., start of recording onto the optical disk 56).

Figure 7:
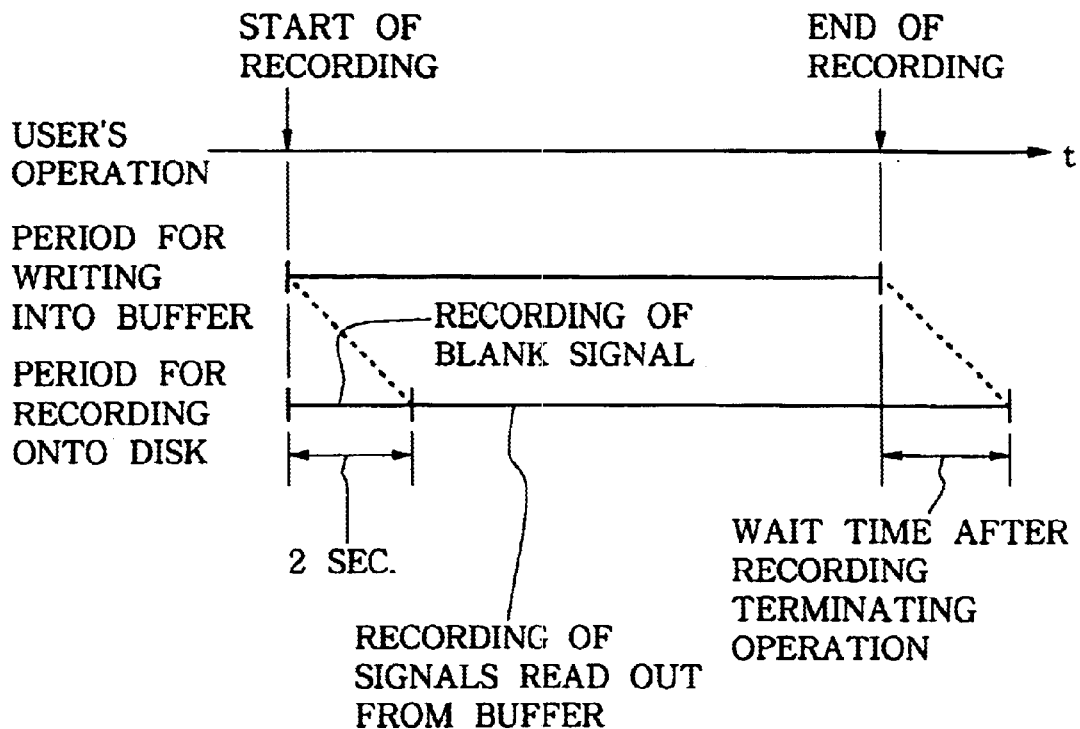
FIG. 7 is a time chart showing another example of the relationship between the user's operation timing, the time period when the input audio signals are written into the buffer memory and the time period when the audio signals are recorded onto the optical disk in the case where the inter-music-piece blank signal is recorded by the audio CD recorder of FIG. 1.
Figure 8:
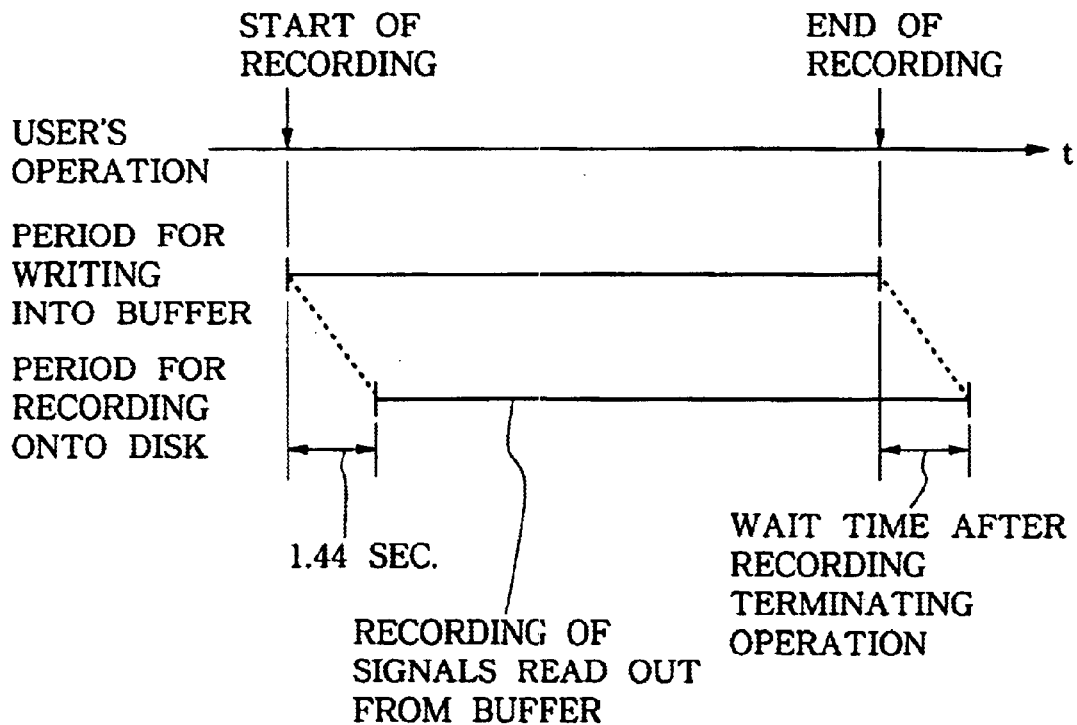
FIG. 8 is a time chart showing still another example of the relationship between the user's operation timing, the time period when the input audio signals are written into the buffer memory and the time period when the audio signals are recorded onto the optical disk in the case where no inter-music-piece blank signal is recorded by the audio CD recorder of FIG. 1.

The following paragraphs describe in details how the wait time from the turning-on of the recording button 28 to the output of recording signals from the CD encoder 82 is controlled in the audio CD recorder 10. Because the writing and readout of the analog audio signals or non-44.1-kHz digital audio signals to and from the buffer memory 80 are both performed in synchronism with the reference clock pulses, the described embodiment can start the recording onto the optical disk 56 substantially simultaneously with the turning-on of the recording button 28 while effectively avoiding the possibility of undesired "buffer underrun". Because the 44.1 kHz digital audio signals are written into the buffer memory 80 in synchronism with the reproduced clock pulses, the buffer underrun may occur if the reproduced clock pulses are delayed relative to the predetermined 44.1 kHz frequency. Therefore, the wait time from the turning-on of the recording button 28 to the output of recording signals from the CD encoder 82 is controlled in accordance with an allowable frequency difference between the two different types of clock pulses and recording length of the inter-music-piece blank signal. If the frequency difference of the reproduced clock pulses from the reference clock pulses is 300 PPM and the total recording time of the CD is 80 min., there would occur a difference of 1.44 sec. between the time for writing all the data into the buffer memory 80 and the time for reading out all the data from the buffer memory 80, so that a need arises for storing the input audio signals for a tome period of 1.44 sec. or more at the beginning of the recording. If, in this case, an inter-music-piece blank signal of a two sec. length is to be recorded at the beginning of the recording, the input audio signals of two sec., longer than 1.44 sec., will have been stored into the buffer memory 80 by a time point when the recording of the input signals is initiated following the recording of the inter-music-piece blank signal, because the input audio signals are written into the buffer memory 80 for two sec. while the blank signal is being recorded. Thus, in this case, there occurs no buffer underrun even when the recording onto the optical disk 56 is initiated simultaneously with issuance of the user's instruction for initiating the recording (i.e., start of the writing into the buffer memory 80, namely, turning-on of the recording button 28); as a consequence, the recording onto the optical disk 56 can be initiated simultaneously with the user's instruction as shown in FIG. 7.

In the case where the input audio signals are to be recorded without recording an inter-music-piece blank signal (this selection is possible in the case of recording for second and succeeding tracks), there may occur the buffer underrun if the recording onto the optical disk 56 is initiated simultaneously with the issuance of the user's instruction for initiating the recording (i.e., turning-on of the recording button 28). Therefore, the recording onto the optical disk 56 is initiated, in the instant embodiment, 1.44 sec. after the user gives the instruction for initiating the recording. Further, in the case where the recording length of the inter-music-piece blank signal can be set as desired by the user, the recording onto the optical disk 56 is started simultaneously with the user's instruction if the length is set to 1.44 sec. or more, but is started after passage of a time period equal to or longer than the difference from 1.44 sec. if the length is set to be shorter than 1.44 sec. Namely, if the wait time from the turning-on of the recording button 28 to the start of the recording onto the optical disk 56 is represented by "P", a time difference between total lengths of all the input data and output data in the buffer memory 80 based on the allowable frequency difference between the reference clock pulses and the reproduced clock pulses is represented by "a" (e.g., 1.44 sec. as in the above mentioned example) and the recording length of the inter-music-piece blank signal is represented by "b", the recording can be carried out without causing the buffer underrun by just controlling the wait time P as follows:

$$P \geq a-b \text{ (where } P \geq 0\text{)} \qquad \text{Expression (1)}$$

Particularly, by setting the wait time P to a value equal to or close to the difference "a−b" within the range satisfying Expression (1) above, it is possible to minimize the wait time from the user's instruction for terminating the recording (writing into the buffer memory 80, i.e. turning-on of the stop button 30) to the time when all the data are read out from the buffer memory 80 and the recording onto the optical disk 56 is actually terminated in response to the instruction.

The embodiment of the present invention has been described above as starting the recording onto the optical disk 56 after placing the audio CD recorder in the recording standby state by operation of the recording standby switch 26 and then turning on the recording button 28, without considering the time necessary for pulling in the servo-mechanisms. In effect, however, when the recording button 28 has been turned on directly without depression of the recording standby switch 26, the recording onto the optical disk 56 is started after completion of the servo pull-in operations (including seek operations). Thus, if the servo pull-in operations are initiated after passage of the wait time P, having been set on the basis of Expression (1) above, from the turning-on of the recording button 28, the input audio signals will be stored into the buffer memory 80 with extras corresponding to the time required for the servo pull-in operations. Therefore, in this case, the servo pull-in operations are initiated simultaneously with the turning-on of the recording button 28, and then the recording onto the optical disk 56 is started either after passage of the wait time P set on the basis of Expression (1) above (in the case where the time required for the servo pull-in operations is shorter than the wait time P) or upon completion of the servo pull-in operations (in the case where the time required for the servo pull-in operations is longer than the wait time P).

Although the preferred embodiment has been described above as applied to an audio CD recorder, the basic principles of the present invention are also applicable to optical disk recording apparatus which record input signals in any other formats than the CD format.

What is claimed is:

1. An optical disk recording apparatus comprising:
   an input device that receives an input digital audio signal sampled by a predetermined sampling rate;
   an external reference clock pulse generator that reproduces a first reference clock pulse on the basis of the input digital audio signal;
   an internal reference clock pulse generator that generates a second reference clock pulse;
   a buffer memory that stores the input digital audio signal therein in synchronism with the first reference clock pulses, and that reads out a stored input digital audio signal therefrom in shynchronism with the second reference clock pulses;
   an operator operable by a user to give an instruction as to whether an inter-music-piece blank signal is to be recorded or not, the inter-music piece blank signal being capable of recording onto an optical disk before recording of the input digital audio signal read from the buffer memory; and
   a controller that, on the basis of the instruction from the operator, when the inter-music piece blank signal is to be recorded, makes to reduce a time interval from start of storing of the digital audio signals into the buffer memory to a start of recording of the digital audio signals onto the optical disk as compared to when the blank signal is not to be recorded.

2. An optical disk recording apparatus as claimed in claim 1 wherein when the inter-music-piece blank signal is to be recorded, said controller makes to start the recording of the digital audio signals onto the optical disk substantially simultaneously with the start of storing of the digital audio signals into said buffer memory.

3. An optical disk recording apparatus as claimed in claim 1 which is capable of selecting, as audio signals to be inputted thereto, from among digital audio signals of a sampling rate equal to a recording sampling rate of an optical disk, digital audio signals of a sampling rate different from the recording sampling rate of the optical disk and analog audio signals, and recording the input audio signals onto the optical disk after converting the sampling rate of the audio signals to coincide with the recording sampling rate of the optical disk, and
   wherein when the digital audio signals of the sampling rate different from the recording sampling rate of the optical disk or the analog audio signals are selected as the audio signals to be inputted, said controller performs control for starting recording of the audio signals onto the optical disk substantially simultaneously with a start of writing of the audio signals into said buffer memory, irrespective of presence/absence or recording length of the inter-music-piece blank signal.

4. An optical disk recording apparatus as claimed in claim 1 which further comprises a motor controller that controls rotation of a spindle motor and a recording strategy circuit that performs fine adjustment/control of an irradiation time and irradiation start timing of a recording laser light beam, and wherein said motor controller and said recording strategy circuit perform predetermined control in synchronism with the reference clock pulses.

5. An optical disk recording apparatus as claimed in claim 1 which is constructed as an audio CD recorder and wherein the optical disk is a CD-R disk or CD-RW disk.

6. An optical disk recording apparatus which receives input digital audio signals of a predetermined sampling rate, temporarily stores the digital audio signals into a buffer memory in synchronism with clock pulses reproduced from the digital audio signals and then reads out, from the buffer memory, the digital audio signals in synchronism with reference clock pulses, generated by an internal reference clock pulse generator, to thereby record the digital audio signals onto an optical disk at a same sampling rate as the input digital audio signals and which is also capable of recording an inter-music-piece blank signal, generated within said optical disk recording apparatus, onto the optical disk at the beginning of recording and then reading out the digital audio signals from the buffer memory for recording onto the optical disk following recording of the blank signal, said optical disk recording apparatus comprising:
   an operator operable by a user to variably set a recording length of the inter-music-piece blank signal; and
   a controller that, on the basis of a user operation of said operator, makes to, when an inter-music-piece blank signal of a relatively long recording length is to be recorded, reduce a time interval from a start of writing of the digital audio signals into said buffer memory to a start of recording of the digital audio signals onto the optical disk as compared to when an inter-music-piece blank signal of a shorter recording length is to be recorded.

7. An optical disk recording apparatus as claimed in claim 6 wherein when an inter-music-piece blank signal of more than a predetermined recording length is to be recorded, said controller makes the recording of the digital audio signals onto the optical disk to start substantially simultaneously with the start of writing of the digital audio signals into said buffer memory.

8. An optical disk recording apparatus as claimed in claim 6 which is capable of selecting, as audio signals to be inputted thereto, from among digital audio signals of a sampling rate equal to a recording sampling rate of an optical disk, digital audio signals of a sampling rate different from the recording sampling rate of the optical disk and analog audio signals, and recording the input audio signals onto the optical disk after converting the sampling rate of the audio signals to coincide with the recording sampling rate of the optical disk, and
   wherein when the digital audio signals of the sampling rate different from the recording sampling rate of the optical disk or the analog audio signals are selected as the audio signals to be inputted, said control section performs control for starting recording of the audio signals onto the optical disk substantially simultaneously with a start of writing of the audio signals into said buffer memory, irrespective of presence/absence or recording length of the inter-music-piece blank signal.

9. An optical disk recording apparatus as claimed in claim 6 which further comprises a motor controller that controls rotation of a spindle motor and a recording strategy circuit that performs fine adjustment/control of an irradiation time and irradiation start timing of a recording laser light beam, and wherein said motor controller and said recording strategy circuit perform predetermined control in synchronism with the reference clock pulses.

10. An optical disk recording apparatus as claimed in claim 6 which is constructed as an audio CD recorder and wherein the optical disk is a CD-R disk or CD-RW disk.

11. A method for recording digital audio signals on an optical disk comprising steps of receiving input digital audio signals of a predetermined sampling rate, temporarily storing the digital audio signals into a buffer memory in synchronism with clock pulses reproduced from the digital audio signals and then reading out, from the buffer memory, the digital audio signals in synchronism with reference clock pulses, generated by an internal reference clock pulse generator, to thereby record the digital audio signals onto an optical disk at a same sampling rate as the input digital audio signals, and also recording an inter-music-piece blank signal onto the optical disk at the beginning of recording and then reading out the digital audio signals from the buffer memory for recording onto the optical disk following recording of the blank signal, said method further comprising steps of:

giving, by an operation by a user, an instruction as to whether the inter-music-piece blank signal is to be recorded or not; and performing, on the basis of the operation by the user, control for, when the blank signal is to be recorded, reducing a time interval from a start of writing of the digital audio signals into said buffer memory to a start of recording of the digital audio signals onto the optical disk as compared to when the blank signal is not to be recorded.

12. A method for recording digital audio signals on an optical disk comprising steps of receiving input digital audio signals of a predetermined sampling rate, temporarily storing the digital audio signals into a buffer memory in synchronism with clock pulses reproduced from the digital audio signals and then reading out, from the buffer memory, the digital audio signals in synchronism with reference clock pulses, generated by an internal reference clock pulse generator, to thereby record the digital audio signals onto an optical disk at a same sampling rate as the input digital audio signals, and also recording an inter-music-piece blank signal onto the optical disk at the beginning of recording and then reading out the digital audio signals from the buffer memory for recording onto the optical disk following recording of the blank signal, said method further comprising steps of:

variably setting, by an operation by a user, a recording length of the inter-music-piece blank signal; and performing, on the basis of the operation by the user, control for, when an inter-music-piece blank signal of a relatively long recording length is to be recorded, reducing a time interval from a start of writing of the digital audio signals into said buffer memory to a start of recording of the digital audio signals onto the optical disk as compared to when an inter-music-piece blank signal of a shorter recording length is to be recorded.

* * * * *